US010257412B2

(12) United States Patent
Kadamani Abiyoma et al.

(10) Patent No.: US 10,257,412 B2
(45) Date of Patent: Apr. 9, 2019

(54) METHOD FOR OBTAINING CHROMATIC ATTRIBUTES OF NATURAL SURROUNDINGS TO DESIGN COLOUR PATTERNS

(71) Applicant: Universidad de los Andes, Bogota D.C. (CO)

(72) Inventors: Samira Kadamani Abiyoma, Bogota D.C. (CO); Olga Amparo Quijano de Rincon, Bogota D.C. (CO); Jorge Enrique Gutierrez Valderrama, Bogota D.C. (CO); Camilo Andres Nemocon Farfan, Bogota D.C. (CO); David Naranjo Romero, Bogota D.C. (CO)

(73) Assignee: UNIVERSIDAD DE LOS ANDES, Bogota D.C. (CO)

( * ) Notice: Subject to any disclaimer, the term of this patent is extended or adjusted under 35 U.S.C. 154(b) by 0 days.

(21) Appl. No.: 15/764,757

(22) PCT Filed: Sep. 30, 2016

(86) PCT No.: PCT/CO2016/000008
§ 371 (c)(1),
(2) Date: Mar. 29, 2018

(87) PCT Pub. No.: WO2017/054785
PCT Pub. Date: Apr. 6, 2017

(65) Prior Publication Data
US 2019/0045113 A1    Feb. 7, 2019

(30) Foreign Application Priority Data

Sep. 30, 2015    (CO) .................................. 15231651

(51) Int. Cl.
*H04N 5/225* (2006.01)
*H04N 5/232* (2006.01)

(52) U.S. Cl.
CPC ....... *H04N 5/23216* (2013.01); *H04N 5/2254* (2013.01); *H04N 5/2258* (2013.01)

(58) Field of Classification Search
CPC ............. G06K 9/4652; G06Q 30/0276; G06Q 30/0641; G06T 11/001; G06T 11/60;
(Continued)

(56) References Cited

U.S. PATENT DOCUMENTS 8,923,569 B2    12/2014   Duarte
9,245,350 B1 *   1/2016   Dorner ................. G06K 9/4652
(Continued)

FOREIGN PATENT DOCUMENTS

| CN | 105681650 A | 6/2016 |
| CO | 6430491 A2 | 4/2012 |
| WO | 2014070168 A1 | 5/2014 |

OTHER PUBLICATIONS

S. Tominaga and T. Fukuda, "Spectral Image Acquisition and Analysis of Omnidirectional Scene," 2008 IEEE Southwest Symposium on Image Analysis and Interpretation, Santa Fe, NM, 2008, pp. 141-144.

(Continued)

*Primary Examiner* — Amy R Hsu
(74) *Attorney, Agent, or Firm* — Armstrong Teasdale LLP

(57) ABSTRACT

The present invention relates to a method for obtaining the chromatic attributes of natural surroundings, which can be used, under the same parameters, in artificial surroundings or mixed surroundings, by means of digital extraction by taking photographs to generate color patterns (natural surroundings are understood to be those linked to the environment and include landscape, vegetation and fauna; artificial (Continued)

surroundings are those in which humans and/or built; and mixed surroundings involve physical characteristics of artificial and natural surroundings). This method is intended to obtain chromatic palettes used on any type of surface that functions as an imitating factor in diverse fields of application, such as: biosecurity, well-being associated with chromatic perception, color psychology, eco-urban landscape, color trends in dress and products, management of indoor and outdoor spaces, and even for the military sector, insofar as the physical and technical principles would be the same as for the civil sector.

17 Claims, 16 Drawing Sheets

(58) Field of Classification Search
CPC . G06T 2207/10024; G06T 7/90; H04N 1/644; H04N 5/23216; H04N 5/2254; H04N 5/2258

See application file for complete search history.

(56) References Cited

U.S. PATENT DOCUMENTS

| | | |
|---|---|---|
| 2002/0080153 A1* | 6/2002 | Zhao ................. H04N 1/644 715/700 |
| 2007/0025723 A1* | 2/2007 | Baudisch ............ G03B 13/02 396/287 |
| 2007/0183656 A1 | 8/2007 | Kuwahara et al. |
| 2012/0019614 A1 | 1/2012 | Murray et al. |
| 2012/0092359 A1 | 4/2012 | O'Brien-Strain et al. |
| 2012/0176515 A1 | 7/2012 | Teo |
| 2015/0109513 A1* | 4/2015 | Nayar ............... H04N 5/23212 348/349 |
| 2016/0196637 A1* | 7/2016 | Nguyen ............... G06T 5/003 348/224.1 |
| 2017/0206691 A1* | 7/2017 | Harrises .............. G06T 11/60 |
| 2018/0027224 A1* | 1/2018 | Javidnia ............ H04N 13/239 382/154 |

OTHER PUBLICATIONS

International Search Report, International Application No. PCT/CO2016/000008 dated May 29, 2017, 2 pages.
Written Opinion, International Application No. PCT/CO2016/000008 dated May 29, 2017, 8 pages.

* cited by examiner

FIG. 7
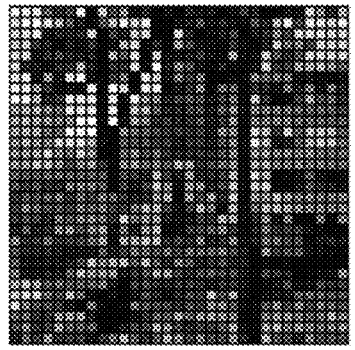
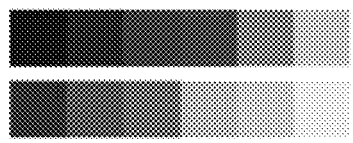

FIG. 8

$$\nabla f = \begin{bmatrix} G_x \\ G_y \end{bmatrix} = \begin{bmatrix} \dfrac{\partial f}{\partial x} \\ \dfrac{\partial f}{\partial y} \end{bmatrix}^{29}$$

FIG. 9

| PIXEL No. | R | G | B | Tone | Saturation | Brightness |

FIG. 11
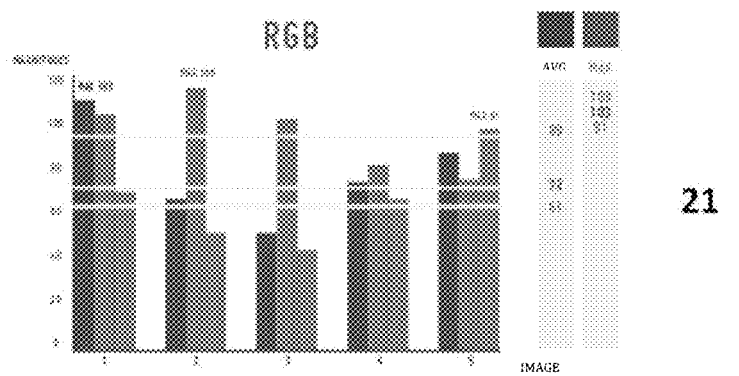
21
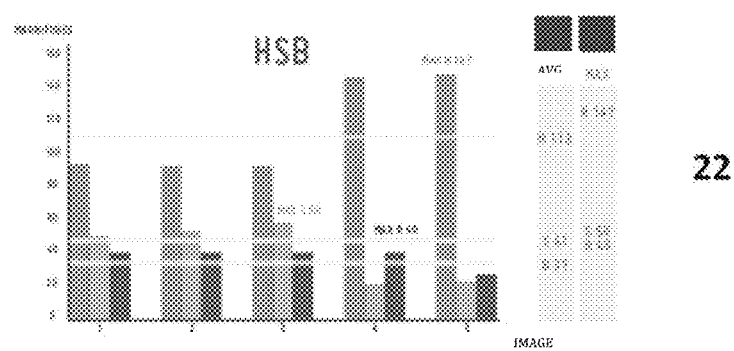
22

| D | | | | | | | | |
|---|---|---|---|---|---|---|---|---|
| t | E | F | G | H | J | K | L | |

METHOD FOR OBTAINING CHROMATIC ATTRIBUTES OF NATURAL SURROUNDINGS TO DESIGN COLOUR PATTERNS

This application claims priority to International Application No. PCT/CO2016/000008 filed Sep. 30, 2016, which claims priority to Columbian Patent Application No. 15231651, filed Sep. 30, 2015, the disclosures or which are hereby expressly incorporated by reference in their entireties.

BRIEF DESCRIPTION OF THE DRAWINGS

FIG. 7 shows a pixel to pixel comparison of two images and significant chromatic palettes.

FIG. 8 shows a gradient mathematical equation.

FIG. 9 shows a report obtained for each analyzed segment of a grid.

FIG. 11 shows a RGB colors percentage matrix and a HSB color characteristic matrix.

FIG. 14 shows characteristics D for generating contrast protocols.

Figure 1:
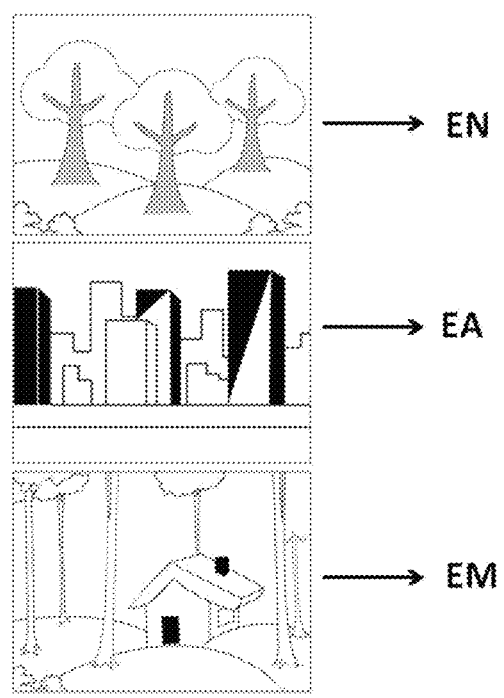
FIG. 1 shows three different environments for color analysis, including a natural environment (EN), an artificial environment (EA), and a mixed environment (EM).
Figure 3:
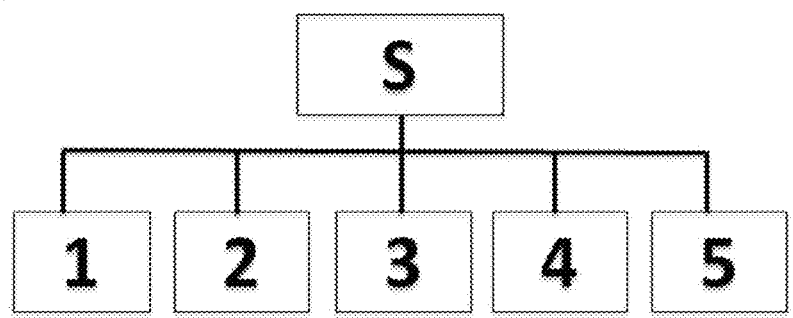
FIG. 3 shows five steps associated with sector precendence, S.

The method patent referred to hereby, corresponds to a process for obtaining the chromatic attributes of a natural environment (NS), artificial environment (AE) or mixed environment (ME) of FIG. 1 of a pilot area, as instrument for quantitatively evaluating color in said environments from the analysis and understanding of the scenario called sector precedence (S) analysis of FIG. 3, for obtaining chromatic pallets applied on any kind of surface as mimesis in several fields of application such as: Biosafety, Wellness associated to chromatic perception, psychology applied through color, eco-urban landscape, chromatic trends in wardrobe and products, management of indoor and outdoor spaces.

For the above, the color is considered the identification perceptual tool, allowing the creation of codes from images selected from its pixel-by-pixel analysis. Said color analysis in the natural environments (NE) of FIG. 1, is born from a vegetable organ which depends on the predomain of Chlorophyll pigments A, B, Xanthene and Beta Carotenes or the combination thereof in different concentrations.

In the vegetable species of the selected sector, the color prevailing is green, due to the presence of chlorophyll pigments A and B. However, the genetic information through phenotypic expressions, the height from the thermal soil in which it is located, the prevalence of light intensity and the environmental phenomena and climate change, generate several manifestations of color tones in different genders and species of plants. In addition to the above, we find the perceptual experience, i.e. the light intensity associated to the viewer, the distance and the height among others.

Similarly, the color analysis in the Artificial Environment (AE) of FIG. 1, arises from the manifestations of the diverse expressions generated by humans, in indoor and outdoor spaces, wherein the cultural, social and technological manifestations emerge, providing a new meaning to materials, shapes and textures comprising such type of environment.

The Mixed Environment (ME) of FIG. 1, is a mixture of variables from the characteristics of (NE) and (AE) of FIG. 1.

The present disclosure allows image management processes to the recognized for (NE), (AE), and (ME) of FIG. 1, in order to achieve the identification of color prevalence.

For the digital processing analysis, monochromatic graphics were used, wherein the images are drawn in a color on a fixed background. The gray tones are simulated under the technique of color simulation (dithering) with the combination of white and black pixels in order to create the illusion of a gray tone.

Two factors are identified: the first factor is the one of the grayscale which allow a pixel to appear in color white, black or one of several gray tones. With the grayscale program assigning eight bits per pixel, it is possible to obtain up to 256 gray tones which is more than the human eye can identify. The second factor is the pixel density which defines the dots per inch (dpi).

Figure 6:
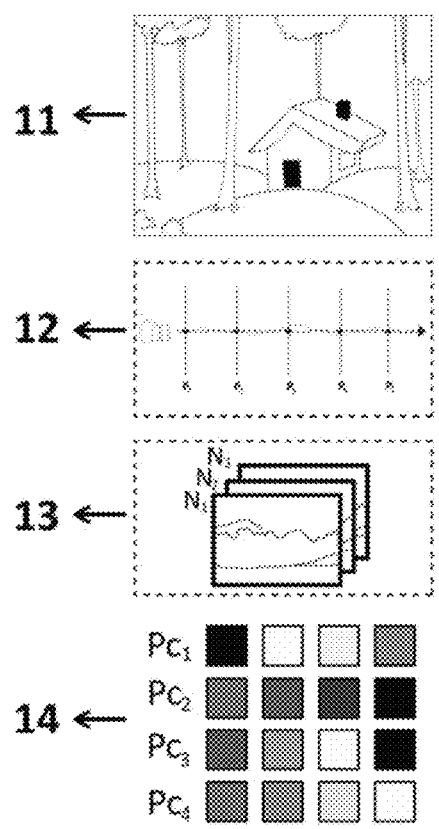
FIG. 6 shows four steps associated with obtain a significant chromatic palette.

Once determined the area to work by the sector precedence (S) of FIG. 3, and the zone study (11) of FIG. 6, the process for generating color patterns which can be adapted as mimesis to any kind of surface, is carried out through five fundamental steps called: obtaining images (1) of FIG. 3, digital treating of the image (2) of FIG. 3, Processing data (3) of FIG. 3, legalizing results (4) of FIG. 3, which also includes an optical contrast test, and the base for generating proposal (5) of FIG. 3.

Figure 2:
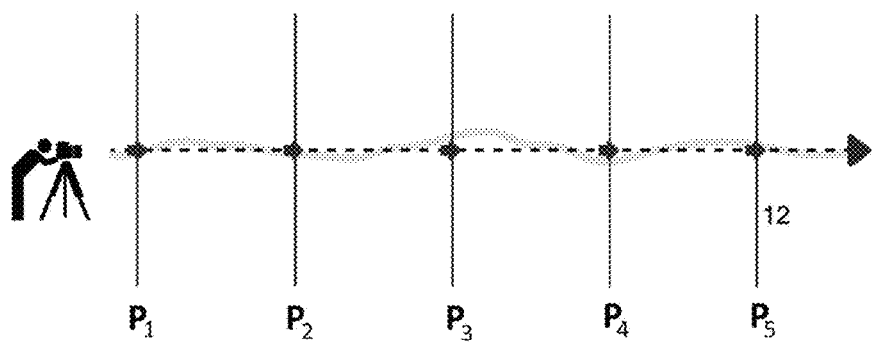
FIG. 2 shows several distances $P_n$ at which several consecutive images in a selected environment are taken.
Figure 14:
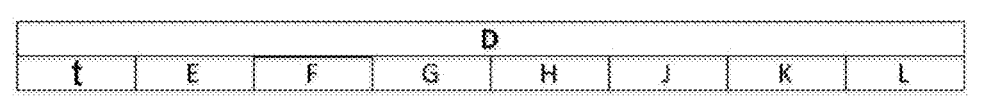

In the first step called obtaining images (1) of FIG. 3 and the distance ranges in intervals P (12) of FIGS. 2 and 6, a photographic record is carried out in sequences of the sector of the selected environment, taking into account these distance ranges P (12) of FIGS. 2 and 6, the light intensity changes—L of FIG. 14—between 5.000 lux and 110.000 lux and the time—t of FIG. 14 of the photographic shot (The Spot selected in high definition with the use of AF DC lenses—8 with Dx zoom 55-200 and lenses plus UV filters), in order to assess the perceptual difference and the depth effect in chromatic relation for each case.

This information is used as depth and contrast axis of the color concentration in each selected image. From these images, we proceed to perform a prevalence statistical analysis of color, with pixel-by-pixel verification (16) of FIG. 7, this can be consistent with the cronbach alfa coefficient of 0.96 and through a Kruskal Walls test.

The second step of digitally treating the image (2) of FIG. 3, which function is to analyze the images in a digital manner so as to acquire the characteristics of the different elements composing it, such as: the tone lighting, dye, clarity, contrast, exposure, saturation and overall all the details of the image. Herein the tone characteristic (20) is properly added, in HSB (22) of FIGS. 10 and 11, saturation (20) in HXB (22) of FIGS. 10 and 11, and brightness (20) in HSB (22) of FIGS. 10 and 11, and the red—R, green—G, and blue—B colors values (19) in RGB (21) of FIGS. 10 and 11 of the processed images for generating the statistical scale of the resulting values and for creating in the future in another patent a chromatic palette about a source image.

In this second step, the images which had been sequentially taken in the environment in distances (P), distance Ranges in intervals P (12) of FIGS. 2 and 6, are involved, in order to reduce the effect of the variable light conditions of the environment.

Figure 4:
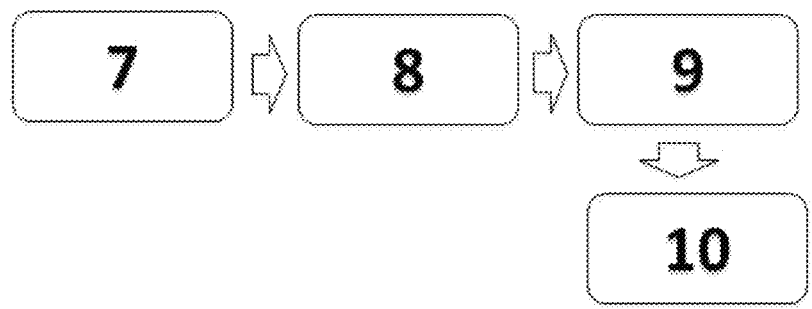
FIG. 4 shows four phases associated with digitally treating an image.
Figure 5:
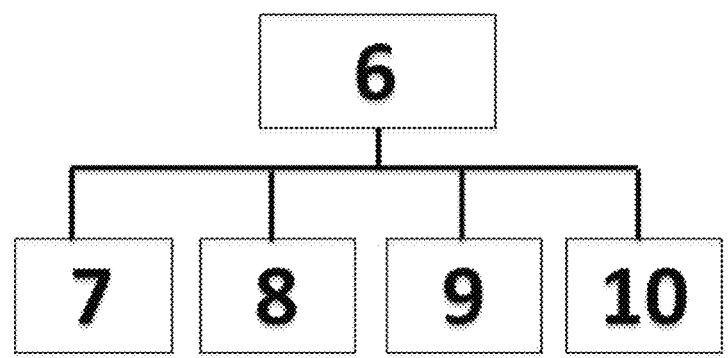
FIG. 5 shows four phases associated with digitally treating an image, including a process consolidating adaptation step.

All the images taken must be assessed through a four phase pipeline defined as (7), (8), (9) and (10) of FIGS. 4 and 5 which must be sequentially worked and are called: selection (7), of FIGS. 4 and 5, focal simplification (8) of FIGS. 4 and 5, abstraction (9) of FIGS. 4 and 5, optical relief analysis (10) of FIGS. 4 and 5, all of them from adaptation (6) of FIG. 5.

The first phase called selection (7) of FIGS. 4 and 5, and selection in the image (15) of FIG. 7 is developed from the number of captures N of consecutive images with a determined focal point (13) of FIG. 6, through a consecutive defined in values of distance P in inches, in order to select an average image which will be the base for the pixel differential study. This average image is the sum of the incidence of light—L—on a selected focal point, the time—t—and distance—P—of the shot.

From this image, a digital process of programming development is utilized, used as tool for producing multimedia and interactive applications; in this case this development environment is used to perform a processing on the pixels of the image, whereby the program adjusts the image resolution to 320×240 pixels and proceeds to perform an image segmentation, unifying the pixel colors, with similar chromatic aspects and producing a Pixel to Pixel (16) verification grid of FIG. 7, which relates the surrounding colors in only one square, obtaining a total of 1.200 squares with all the characteristics of the image, in order to obtain an average chromatic table which will be the main base for the analysis of the consecutive shots made.

Figure 12:
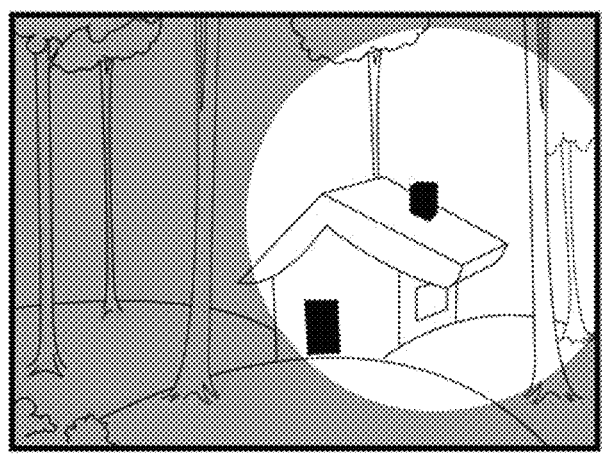
FIG. 12 shows diverse elements of a landscape.

The second phase called focal simplification (8) of FIGS. 4 and 5 and (13) of FIGS. 6 and 12 according to the results obtained from the pixel-to-pixel image analysis, analyzes the most important segment on the over-position of the consecutive images in which the pixels are synthetized until obtaining again an average reference image, in order to obtain an adequate size reducing the analysis time of the RGB codes without affecting the reference histograms.

At this point of the image digital treatment, the program goes through each of the generated squares and collects the values of the image consecutive segment in a database and from the algorithm based on the gradient mathematical equation (29) of FIG. 8, the colors and edges of each of the shapes composing it, are determined.

Figure 10:
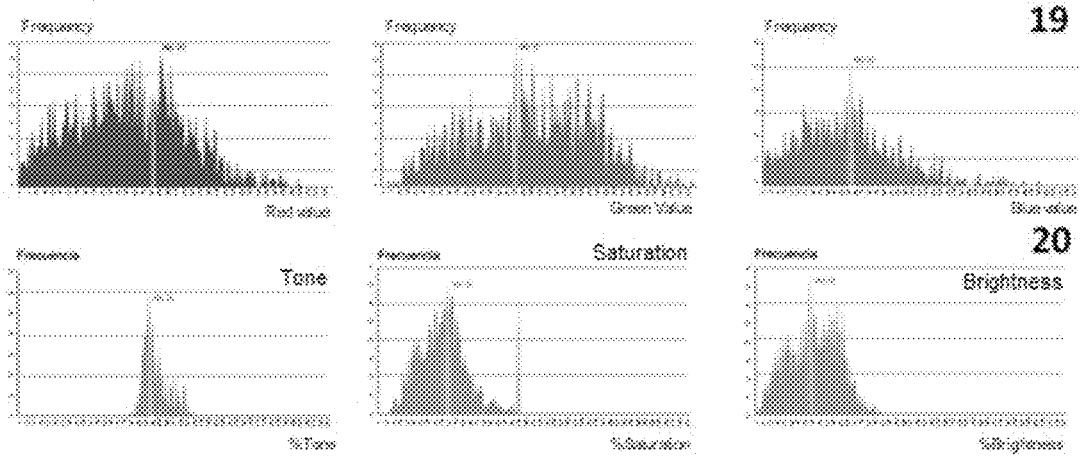
FIG. 10 shows data associated with digitally treating an image.

The third phase called abstraction (9) of FIGS. 4 and 5, consists in separating the Red, Green and Blue RGB colors (19) and (21) of FIGS. 10 and 11 from each image, these components have a value corresponding to the range from 0 to 255 and the tone, brightness and saturation intensities in HSB (20) and (22) of FIGS. 10 and 11 for comparing the highest ranges to the lowest ones, which will allow to determine the most relevant points of color in the images sequence of the selected area.

Figure 9:
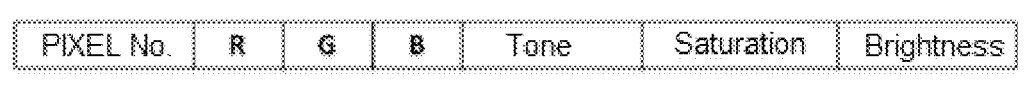

With the processing, a report with 7 values is obtained (FIG. 9) for each analyzed segment of the grid in the following order: Number of pixel, red value, green value, blue value, tone, saturation and brightness.

The fourth phase called optical relief analysis (10) of FIGS. 4 and 5, allows to simplify the tone scales to obtain the average ranges between high and low, obtaining thereby tentative color patterns—Pc—(14) of FIG. 6, the most representative color tentative patterns in the selection of image (17) of FIG. 7 and the most representative color tentative patterns of the Natural Environment (NE) of FIG. 1, artificial environment (AE) of FIG. 1 and Mixed Environment (ME) of FIG. 1 taken as case of zone study (11) of FIG. 6.

By analyzing the colors in a specific area, three factors are taken into consideration: the first factor called image noise, which arises as several consecutive images are taken at several distances P (12) of FIGS. 2 and 6, wherein the elements from (NE), (AE) and (ME) of FIG. 1 are captured, which are not of interest in the analysis (13) of FIG. 12.

Since a pixel to pixel comparison of the images (15) and (16) of FIG. 7 is necessary, it is also necessary to obtain a proper resolution and focal simplification (as second factor) which allow its statistical analysis and comparison with the histogram obtained RGB (19), and (21) of FIGS. 10 and 11 and HSB (20) and (22) of FIGS. 10 and 11. It is here where a scale change to the average image obtained is made, such that it allows to simplify the pixels to maintain the color frequency, so as to obtain a significant chromatic palette (14) of FIG. 6 and (17) and (18) of FIG. 7.

The third factor is the images misalignment produced by the random movement obtained by pressing the shutter of the camera in the images shot at determined distances in which different and diverse elements of the landscape (13) of FIG. 12 emerge.

Finally, the entire process consolidates as the adaptation (6) of FIG. 5, which determines the platform for the development of the previous phases by combining programs interconnected to each other.

The third step is called processing data (3) of FIG. 3, wherein a statistical analysis is generated on the contrast protocols developed according to the characteristics (D) of FIG. 14. Herein the significant difference between the control pattern (17) of FIG. 7 and the proposed Pattern (18) of FIG. 7 is identified, which arises from the optical contrast test through the chromatic sensitivity tests at the different viewing distances of the humans involved in the test.

Figure 13:
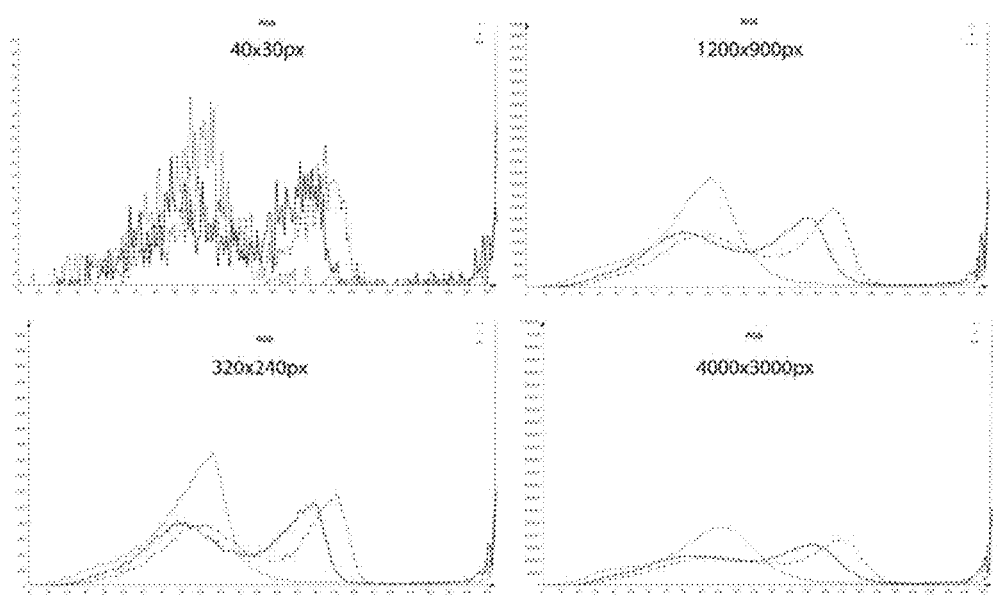
FIG. 13 shows an image chromatic analysis and dominant RGB matrix.

The fourth step of the process corresponds to the legalization of results (4) of FIG. 3, in which three matrices were developed for the color analysis of each image capture; these matrices have been called HSB color characteristic matrix (22) of FIG. 11 which correspond to an image grayscale analysis and processing and an image chromatic processing, followed by the RGB colors percentage matrix (21) of FIG. 11 which corresponds to an image chromatic analysis and dominant RGB matrix (30) of FIG. 13 wherein the red, green and blue tones are determined as dominant in the image, and the color occupying the largest area of the environment.

Figure 15:
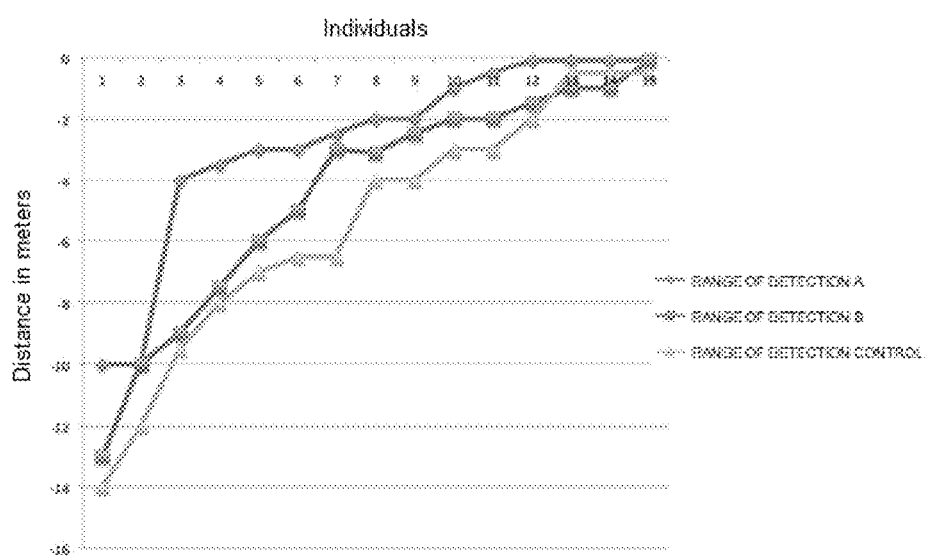
FIG. 15 shows ranges of detection A, B, and C worked in variables of Individuals and Distance in meters.

The first matrix establishes the characteristics of each image to compare them to each other and to determine similitudes and differences. The prevalence of variables if images are: clarity, tint, saturation, contrast, value of exposure and distance (22) of FIG. 11, the second matrix establishes the characteristics of each image to compare them with the matrices of analysis by pixel py color and to determine if these are suitable or not to be applied in the proposal of new chromatic tables. The reference values thereof are: luminance, saturation, brown average, green average, blue average, black average, value of exposure and distance (21) of FIG. 11 (here the Ranges of detection A (RDA), B (RDB) and C (RDC) are worked in variables I (Individual) and Distance in meters (DM) of FIG. 15).

Finally, the third matrix establishes the dominant RGB of the image, whereby it is specified that the pattern with the largest area must have a determined color. This matrix provides the graphics wherein the levels or blue, green and reed comprising the image will be seen. The variables thereof are: R (red), G (green), B (blue) value of exposure and distance (30) of FIG. 13.

In the Legalization of results, the optical contrast test is included, which function is to develop mixed Laboratory/Field tests in the natural environment for establishing disruption criteria in the mimesis patterns.

In this contrast test, the time index (t) is deduced through several characteristics (D) in which at least 45 humans or observers involved (E) of both genders (F) and different ages (G) with high rank of detection (H), visual acuity (J), in several distances (detection range measured in meters), detection time (K) and lumens (L), which should recognize the mimetic effect of the object (FIG. 14).

Figure 16:
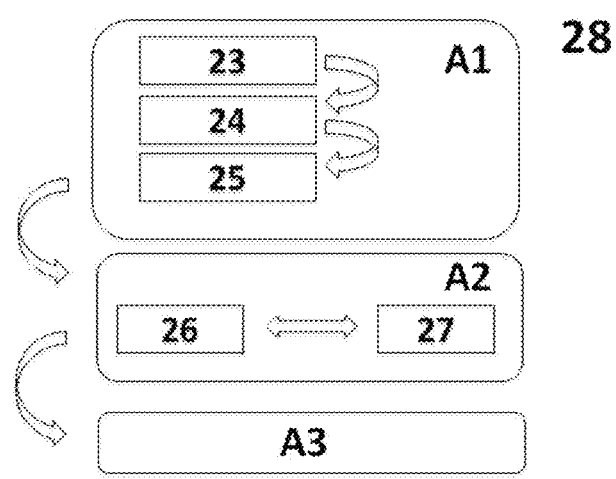
FIG. 16 shows analysis protocols A1, A2, and A3.

It is finalized with the fifth step of the process called Proposal generation base (5) of FIG. 3, which has as a function the formulation of new chromatic games in patterns applicable to several contexts, through three analysis protocols (28) (A1, A2 and A3) of FIG. 16, from which the present document only encompass the first two (A1) and (A2) since the third one (A3) works for the definition of the chromatic palette of FIG. 16 and the implementation on the selected patter, which would be considered as part of an invention patent on a further product.

In protocol (A1) of FIG. 16, the density of image is worked for analysis of 1200 pixels (23) of the frame (28), the processing of the set of image by ecosystem (24) of the frame (28) and the quantitative analysis of the imagen (25) of the frame (28). And in protocol (A2) of FIG. 16, the histograms of frequency (26) of the frame (28) and the identification of mean and maximum values (27) of the frame (28) are handled.

The invention claimed is:

1. A process for obtaining a chromatic attribute of natural environments to design color patterns, the process comprising a first image obtaining step, a second image treating step, a third data processing step, a fourth legalization of results step, and a fifth proposal generation base step, the process further comprising taking an image with a digital camera, where a resolution of the camera is up to 1440×2160 pixels, and where the camera comprises:
 a lens or objective with a focal distance between 35 mm and 105 mm and a visual angle between 62 degrees and 23 degrees.

2. The process for obtaining chromatic attributes of natural environments to design color patterns according to claim 1, wherein the first image obtaining step is achieved through the use of photosensitive cells of mono-crystalline silicon.

3. The process for obtaining chromatic attributes of natural environments to design color patterns according to claim 1, wherein the second image treating step, is carried out by the conversion of information from complementary metal oxide semiconductor (CMOS) sensors with about 10 million active elements or a charge-coupled device (CCD) with a sensitive factor of 100%.

4. The process for obtaining chromatic attributes of natural environments to design color patterns according to claim 1, wherein the third data processing step comprises processing data associated with the image, and is carried out through an algorithm microprocessor.

5. The process for obtaining chromatic attributes of natural environments to design color patterns according to claim 1, wherein the fourth legalization of results step comprises developing a first color characteristic matrix, a second RGB colors percentage matrix, and a third dominant RGB matrix for a color analysis of the image using a complex instruction set computer (CISC) processor.

6. The process for obtaining chromatic attributes of natural environments to design color patterns according to claim 1, wherein the fifth proposal generation base step is determined by protocols and histograms which are worked in units of output devices and substrate printing.

7. The process for obtaining chromatic attributes of natural environments to design color patterns according to claim 2 wherein the silicon photosensitive cells process light intensity between 5000 lux and 110000 lux, and wherein a plurality of images are obtained at distance intervals of about 20 meters.

8. The process for obtaining chromatic attributes of natural environments to design color patterns according to claim 1 wherein a reduced instruction set computer (RISC) type microprocessor assesses the image by sequentially evaluating a first selection phase, a second focal simplification phase, a third abstraction phase, and a fourth optical relief analysis phase.

9. The process for obtaining chromatic attributes of natural environments to design color patterns according to claim 8 wherein the first selection phase is accomplished using image averaging sensors, where the image averaging sensors differ in pixel up to 960.000 along an axis.

10. The process for obtaining chromatic attributes of natural environments to design color patterns according to claim 8 wherein the second focal simplification phase is accomplished using sensors that are reducers to R256×G256×B256.

11. The process for obtaining chromatic attributes of natural environments to design color patterns according to claim 8 wherein the third abstraction phase is accomplished using a sensor that streamlines recording of information in cells being interpreted in output devices in brightness scales between 0 and 255.

12. The process for obtaining chromatic attributes of natural environments to design color patterns according to claim 8 wherein the fourth optical relief analysis phase is accomplished using verification grids applied with an exposure type chip for patterns of color by areas.

13. The process for obtaining chromatic attributes of natural environments to design color patterns according to claim 12 wherein in the fourth optical relief analysis phase a matrix CCD sensor and three exposure chips work the pixel up to 1200×800 and increased International Standards Organization (ISO) values.

14. The process for obtaining chromatic attributes of natural environments to design color patterns according to claim 4 wherein the third data processing step further comprises developing contrast protocols and wherein the algorithm microprocessor comprises an input and output 32 bit branched prediction unit.

15. The process for obtaining chromatic attributes of natural environments to design color patterns according to claim 5 wherein in the fourth legalization of results step the first color characteristic matrix, the second RGB colors percentage matrix, and the third dominant RGB matrix are generated through CISC processing unit of more than 100 cycles for an RGB maximum of 108 and an average of 89, and a hue, saturation, and brightness (HSB) average selected from one of 113, 42 and 37 and maximum selected from one of 147, 58 and 60.

16. The process for obtaining chromatic attributes of natural environments to design color patterns according to claim 15 wherein the CISC processing unit processes histograms using a first protocol and a second protocol.

17. The process for obtaining chromatic attributes of natural environments to design color patterns according to claim 16 wherein in the fifth proposal generation base step chromatic sets on the first and second protocols are stored in an output device unit, where the output device unit is one of a magnetooptical device, a floptic through laser sensors device, or speed memories device of 16× in process of 2400 kB/s.

* * * * *